United States Patent
Nomoto et al.

(10) Patent No.: US 6,724,415 B2
(45) Date of Patent: Apr. 20, 2004

(54) IMAGE RECORDER AND METHOD OF RECORDING IMAGE

(75) Inventors: Hiroshi Nomoto, Kyoto (JP); Takahide Hirawa, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 0 days.

(21) Appl. No.: 10/175,380

(22) Filed: Jun. 20, 2002

(65) Prior Publication Data

US 2003/0001946 A1 Jan. 2, 2003

(30) Foreign Application Priority Data

Jun. 29, 2001 (JP) .................................. P2001-199082

(51) Int. Cl.[7] .................................................. B41J 2/47
(52) U.S. Cl. ........................................................ 347/254
(58) Field of Search ................................ 347/237, 240, 347/236, 246, 247, 251, 252, 253, 254

(56) References Cited

U.S. PATENT DOCUMENTS 6,130,700 A * 10/2000 Murayama et al. ......... 347/240

2002/0008756 A1 * 1/2002 Hirooka et al. ............. 347/246

* cited by examiner

*Primary Examiner*—Hai Pham
(74) *Attorney, Agent, or Firm*—McDermott, Will & Emery (57) ABSTRACT

An image quality on a recording material is influenced by, for example, the sensitivity of a developer for use in developing the recording material. Compensating for the lowering of the sensitivity of the developer requires increasing the amount of emission of a laser beam. However, there is a difference in the amount of change between dimensions, in a main scanning direction and in a sub-scanning direction, of a dot blackened depending on the increase in the amount of emission of the laser beam. Increasing or decreasing the time duration of emission of the laser beam by a predetermined amount achieves adjustment of the dimension of the dot in the main scanning direction. Specifically, there is provided a memory for storing therein the sensitivity of the developer, the amount of emission of the laser beam and the time duration of emission of the laser beam in corresponding relation to each other, and the emission from a laser light source is adjusted by reading the amount and time duration of emission corresponding to the sensitivity of the developer from the memory.

14 Claims, 14 Drawing Sheets

| PLATE TYPE 62 | ELECTRIC CONDUCTIVITY 61 | LIGHT EMISSION TIMING CORRECTION SIGNAL 63 | | LASER LIGHT AMOUNT SIGNAL 64 |
|---|---|---|---|---|
| | | INCREASE/DECREASE INDICATION SIGNAL 63a | CORRECTION AMOUNT INDICATION SIGNAL 63b | |
| A | C0 | A | D0 | P0 |
| A | C1 | D | D1 | P1 |
| A | C2 | A | D2 | P2 |
| A | C3 | A | D3 | P3 |
| ... | ... | ... | ... | ... |
| A | Cn | A | Dn | Pn |
| B | C0 | A | D0 | P0 |
| B | C1 | D | D1 | P1 |
| B | C2 | A | D2 | P2 |
| B | C3 | A | D3 | P3 |
| ... | ... | ... | ... | ... |
| B | Cn | A | Dn | Pn |

IMAGE RECORDER AND METHOD OF RECORDING IMAGE

BACKGROUND OF THE INVENTION

1. Field of the Invention

The present invention relates to an image recorder for directing a laser beam onto a recording material to record information about an image on the recording material.

2. Description of the Background Art

An example of background art image recorders directs a laser beam modulated in accordance with an image signal onto a recording material to selectively form a plurality of dots (or a latent image of dots) on the recording medium, thereby recording information about a two-dimensional image thereon. After development, a region on the recording material in which energy exceeding a predetermined threshold is stored is blackened to become a visible dot. For high-quality image recording, it is necessary to record information about an image so that a plurality of dots to be formed have a desired size. Factors which influence the size of dots to be formed on the recording material are roughly divided into three types: factors inherent in a characteristic of the recording material (such as a gamma characteristic of the recording material); factors dependent upon the image recorder (such as the time duration of light emission from a laser light source per dot, and an energy amount (density) of a laser beam or the amount of light emitted from the laser light source); and factors dependent upon a recording material developing apparatus (such as a developer (developing solution) sensitivity, a developer temperature, and developing time).

Figure 15:
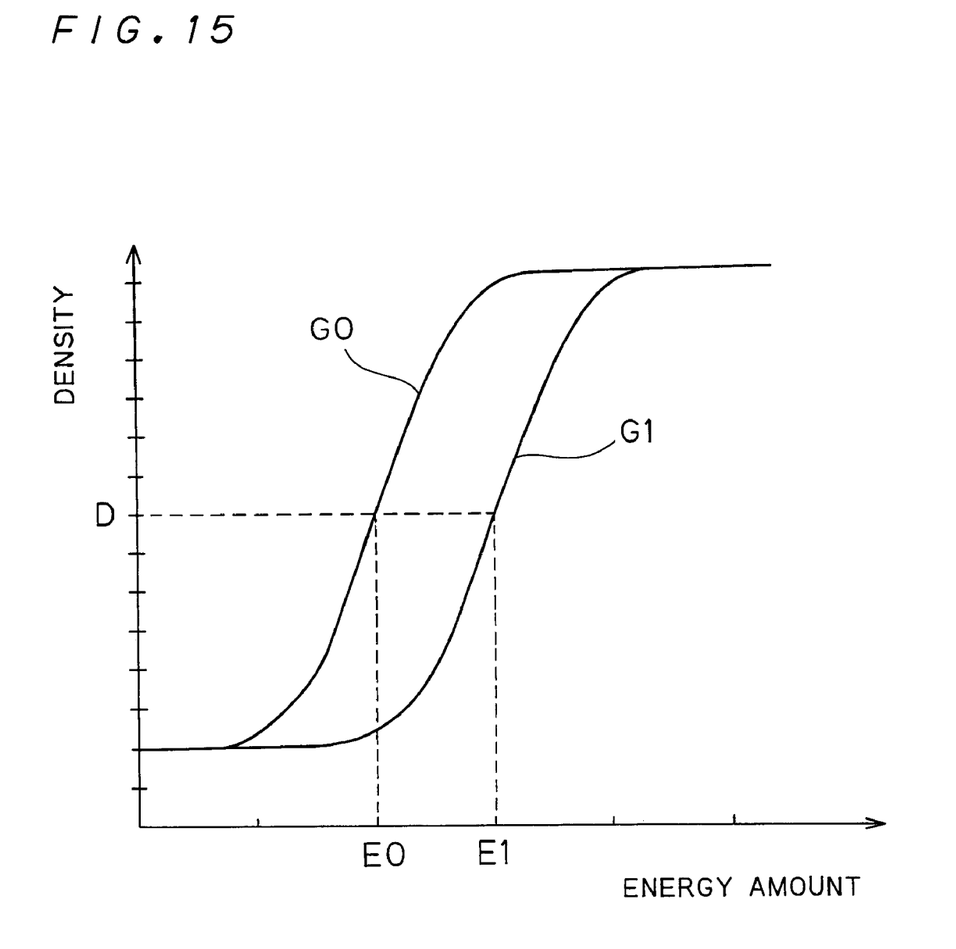
FIG. 15 shows a relation between a gamma characteristic of a recording material and a required energy amount.

The influence of the sensitivity of a recording material upon a dot density and a dot size will be described with reference to FIG. 15. FIG. 15 shows a correlation between the amount of energy provided to the recording material by the laser beam and a black density of the recording material. As illustrated in FIG. 15, producing an image at a desired density D on a recording material having a gamma characteristic G0 requires irradiation of the recording material with a laser beam having an energy amount E0, whereas producing an image at a desired density D on a recording material having a gamma characteristic G1 requires irradiation of the recording material with a laser beam having an energy amount E1. Thus, there are variations in required energy amount depending on the sensitivity of the recording material. Further, the energy amount of a beam spot, in general, shows a concentric intensity distribution. Thus, irradiation of the recording material with the laser beam having an energy amount held at E0 in spite of a change in the gamma characteristic of the recording material from G0 to G1 results in the recorded dots having a relatively small size.

Of the three factors (the developer temperature, the developing time and the developer sensitivity) dependent upon the recording material developing apparatus, the developer temperature and the developing time are relatively easily controlled optimally by the developing apparatus. It has been, however, difficult to control the developer sensitivity to be held constant because of its characteristic. This presents a problem such that, even if the image recorder forms a correct latent image of dots on the recording material, the developing apparatus cannot correctly develop the recording material to fail to form dots of desired density and size on the recording material.

SUMMARY OF THE INVENTION

The present invention is intended for an image recorder for recording information about a two-dimensional image made up of a plurality of dots on a recording material by relatively moving a laser spot in a main scanning direction and in a sub-scanning direction, the laser spot being formed on the recording material by irradiation with a laser beam.

According to the present invention, the image recorder comprises: a laser light source for emitting the laser beam; a laser light source drive part for driving the laser light source, based on an image signal; an input part for inputting factor information influencing the size of the dots; and a setting part for adjusting and setting a light emission duration per dot and a light emission amount of the laser light source in accordance with the factor information inputted by the input part.

The image recorder can adjust and set the light emission duration per dot and the light emission amount of the laser light source to individually adjust the dimensions, in the main scanning direction and in the sub-scanning direction, of the dots to be formed on the recording material. This allows the proper recording of the information about the two-dimensional image even if a change occurs in the factor information influencing the dot dimensions to cause non-uniform changes in the dot dimensions in the main scanning direction and the sub-scanning direction.

According to one aspect of the present invention, the factor information includes at least one of a first factor related to a characteristic of the recording material and a second factor related to processing of a recorded material.

This allows the proper recording of the information about the two-dimensional image even if a change occurs in at least one of the first factor related to the characteristic of the recording material and the second factor related to processing of the recorded material to cause a change in the dot dimensions.

According to another aspect of the present invention, the image recorder further comprises an image signal correction part for correcting the image signal to be provided to the laser light source drive part, wherein the setting part is capable of providing a light emission timing correction signal for correcting the light emission duration of the laser light source to the image signal correction part, and of providing a light amount setting signal for setting the light emission amount of the laser light source to the laser light source drive part.

This simplifies the adjustment of the light emission duration and the light emission amount of the laser light source.

According to another aspect of the present invention, the image recorder further comprises a memory for storing therein the factor information, the light emission timing correction signal and the light amount setting signal in corresponding relation to each other, wherein the setting part reads from the memory the light emission timing correction signal and the light amount setting signal corresponding to the factor information inputted by the input part.

This facilitates the obtainment of the proper light emission duration and light emission amount of the laser light source corresponding to the factor information.

The present invention is also intended for a method of recording information about a two-dimensional image made up of a plurality of dots on a recording material by relatively moving a laser spot in a main scanning direction and in a sub-scanning direction, the laser spot being formed on the recording material by irradiation with a laser beam.

It is therefore an object of the present invention to provide an image recorder capable of constantly recording information about a desired two-dimensional image on a recording material independently of a change in factor information influencing the size of dots.

These and other objects, features, aspects and advantages of the present invention will become more apparent from the following detailed description of the present invention when taken in conjunction with the accompanying drawings.

DESCRIPTION OF THE PREFERRED EMBODIMENTS

The principles of the present invention will be described first.

For stable image quality, it is necessary that a dimension (referred to hereinafter as a sub-scanning dimension) of a dot in a sub-scanning direction and a dimension (referred to hereinafter as a main scanning dimension) thereof in a main scanning direction are held constant independently of a change in the aforementioned various factors (the recording material sensitivity, the developer sensitivity, and the like) which influence the dot size. This is achieved by adjusting the balance between the factors. However, if the developer sensitivity is lowered, this problem is not solved by a simple technique such as to increase the amount of light to compensate for the lowered developer sensitivity.

Figure 1:
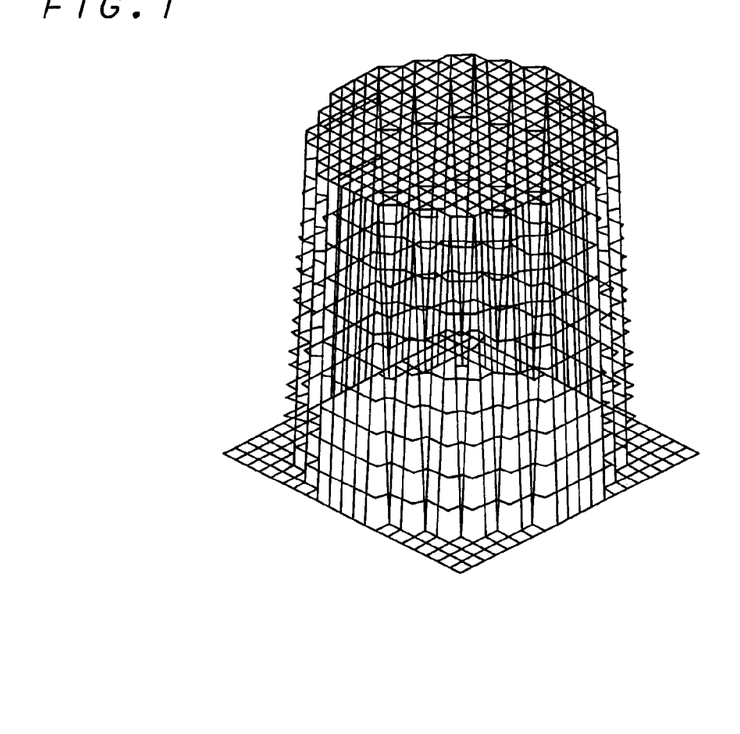
FIG. 1 is a conceptual view of a beam profile of a laser beam.
Figure 2:
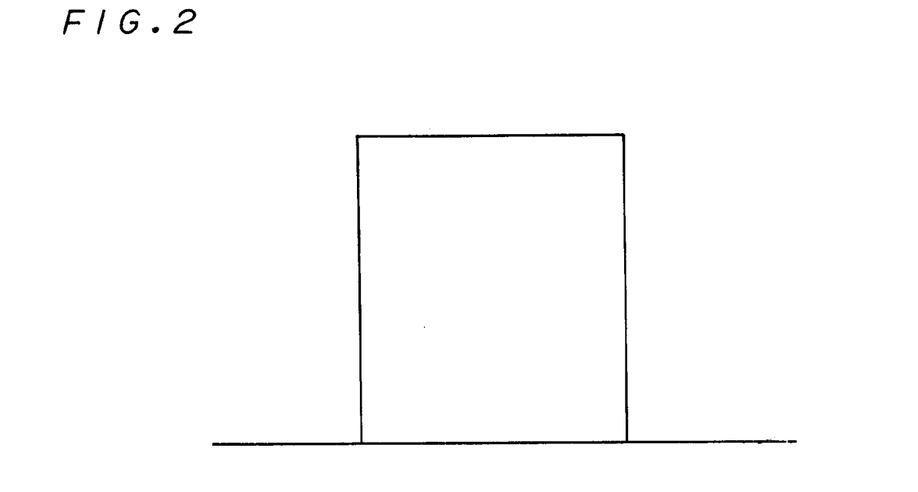
FIG. 2 shows a waveform of a laser light source drive signal.
Figure 3:
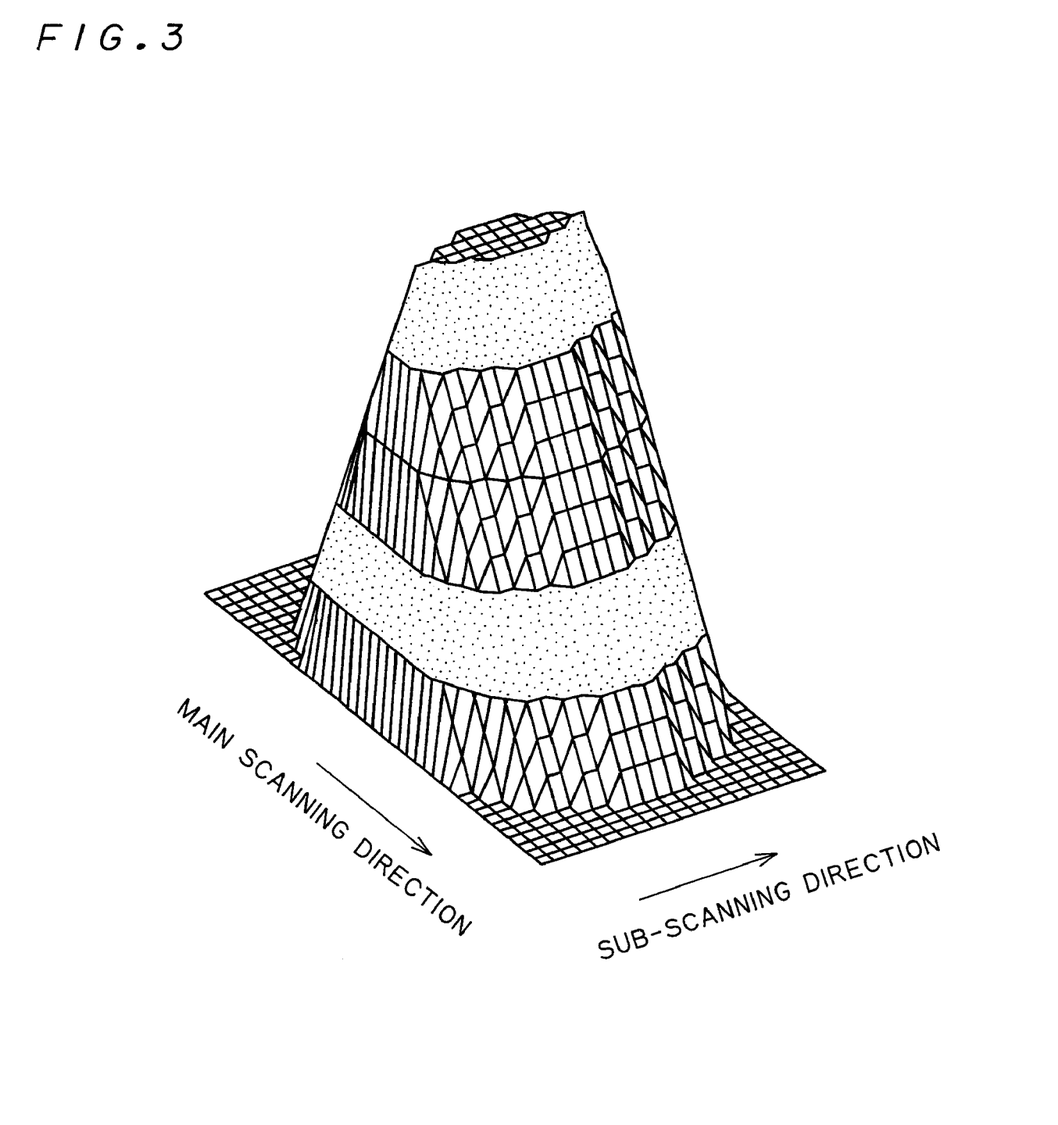
FIG. 3 shows an energy distribution of the laser beam.
Figure 4:
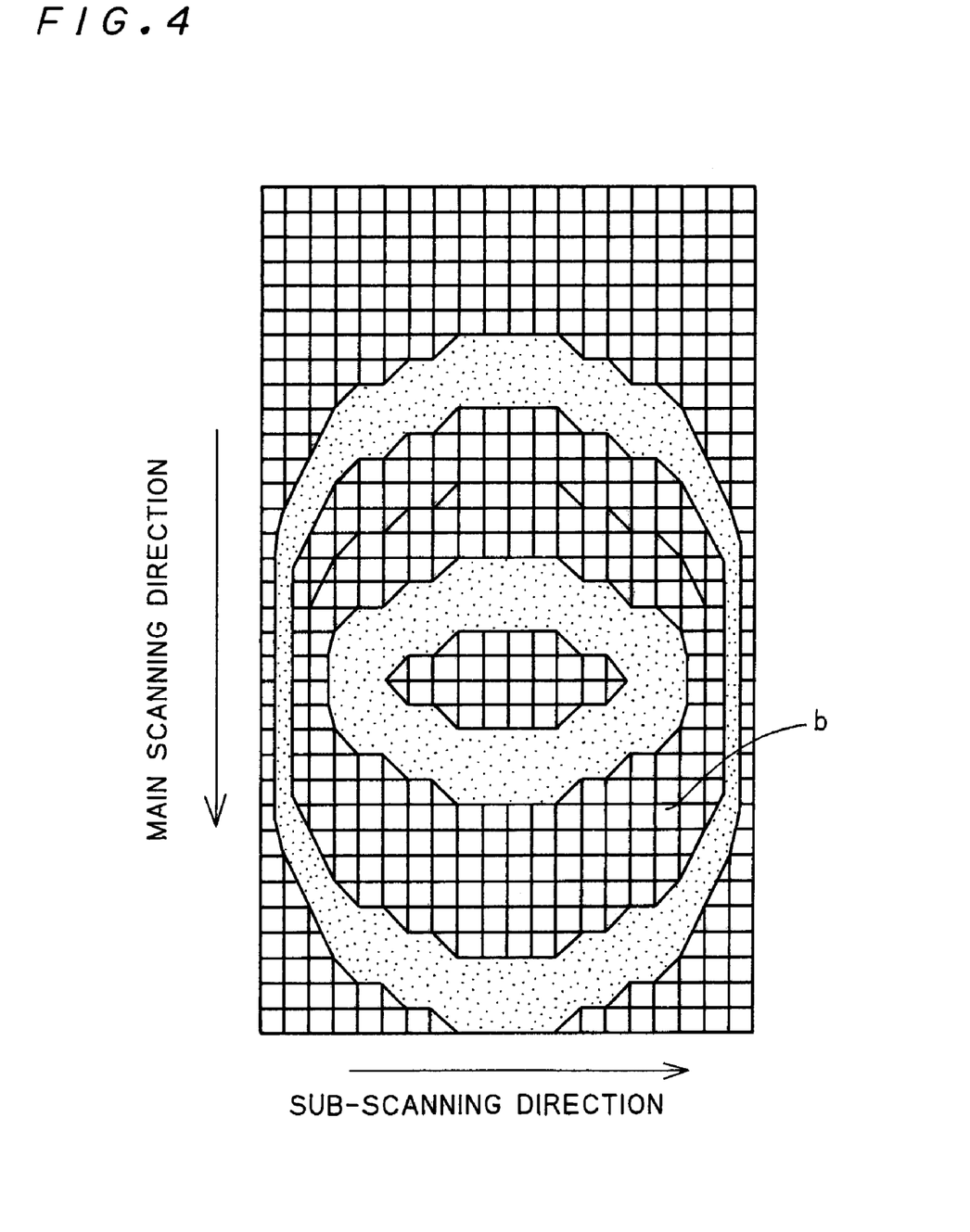
FIG. 4 shows energy storage caused by laser beam irradiation.

FIG. 1 shows an example of the profile of a laser beam held stationary. When a pulse having a waveform as shown in FIG. 2 is applied as a laser light source drive signal to drive a laser light source while moving the laser beam relative to a recording material, energy having a distribution as shown in FIG. 3 is stored in the recording material. As a result, energy exceeding a blackening threshold is stored in a region indicated by the reference character b in FIG. 4 showing the energy storage resulting from the laser beam irradiation.

The lowering of the developer sensitivity causes the region b to be insufficiently blackened, resulting in the formation of a dot having an insufficient size. In this case, the amount of light emitted from the laser light source may be increased to change the energy distribution of a beam spot.

It should be noted, however, that the adjustment of the amount of light emitted from the laser light source has different degrees of influence upon the main scanning dimension and the sub-scanning dimension, respectively, of the dot. Specifically, the sub-scanning dimension of the region to be blackened is approximately equal to the dimension of a section, taken on the blackening threshold, of the energy distribution of a laser spot moving on the recording material. However, in order to determine the main scanning dimension of the region, it is necessary to consider more than one factor. Since the image formation position of the laser spot on the recording material is always moving in the main scanning direction even during the exposure of the same dot, not only the shape of the laser spot but also the waveform of the laser light source drive signal is closely related to the main scanning dimension of the region to be blackened.

Figure 5:
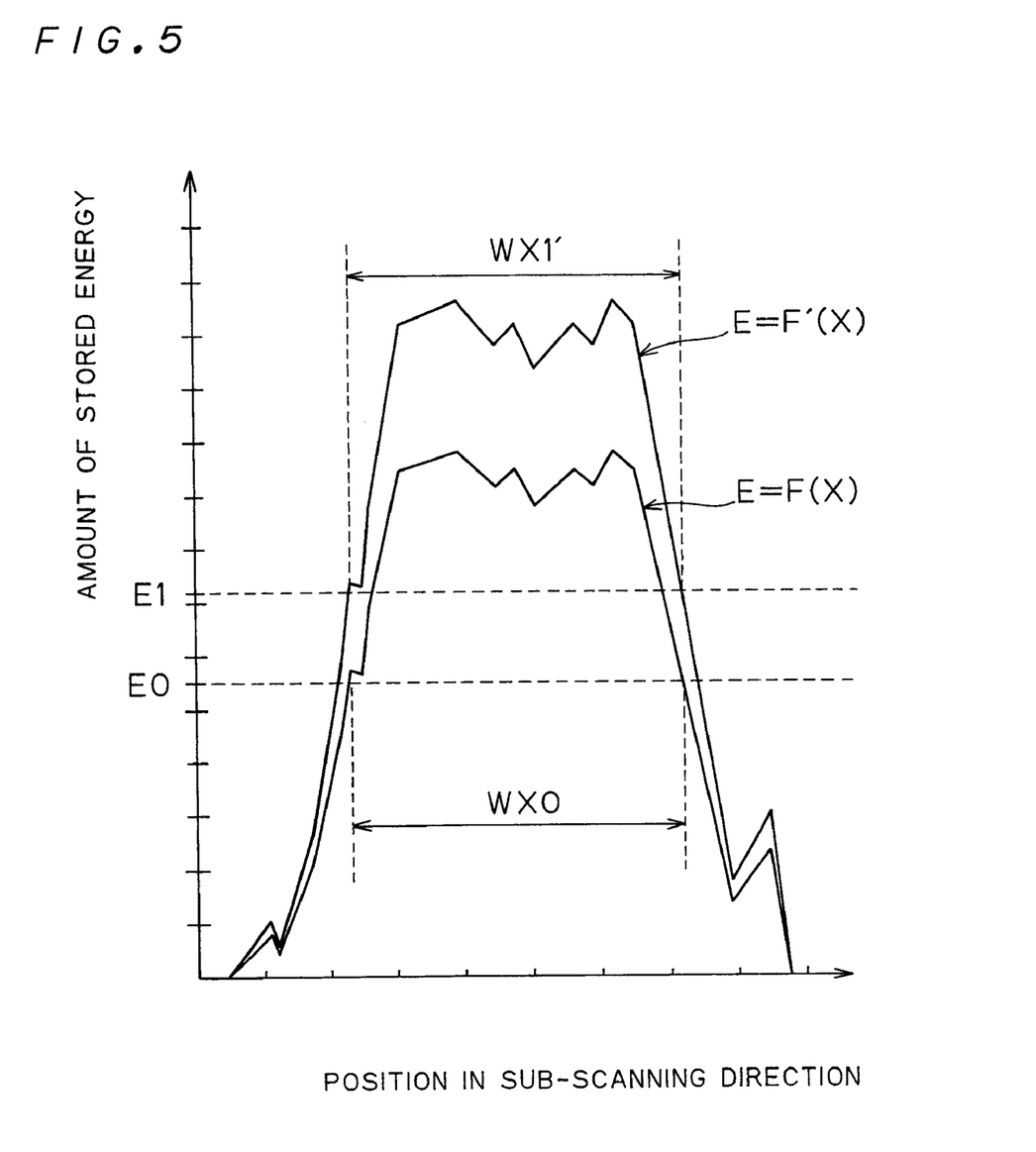
FIG. 5 is a graph representing the energy distribution of the laser beam in a sub-scanning direction.
Figure 6:
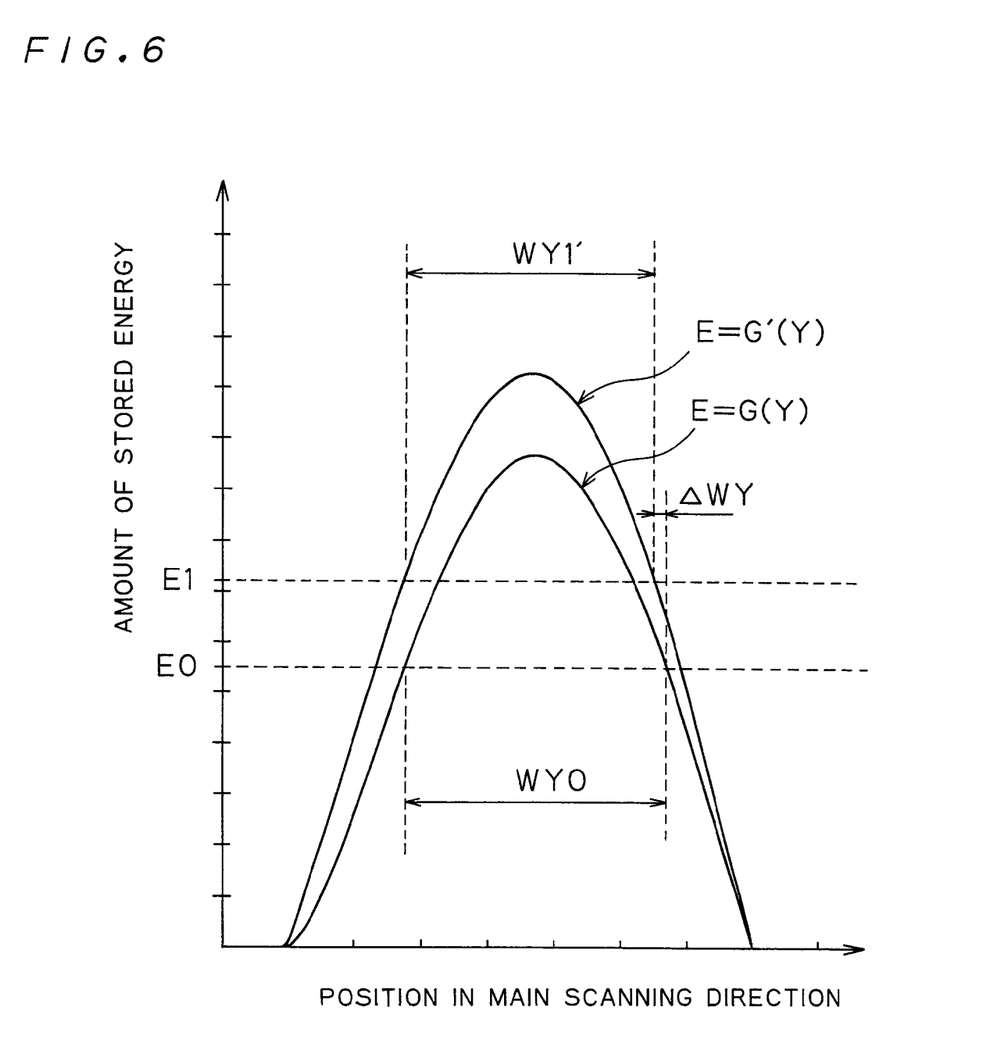
FIGS. 6 and 7 are graphs representing the energy distribution of the laser beam in a main scanning direction.

The foregoing will be detailed with reference to FIGS. 5 and 6. FIG. 5 shows the position of the laser beam in the sub-scanning direction (along the horizontal axis) versus the amount of energy stored by the laser beam directed onto various positions (along the vertical axis). FIG. 6 shows the position of the laser beam in the main scanning direction (along the horizontal axis) versus the amount of energy stored by the laser beam directed onto various positions (along the vertical axis). It is now assumed that a required sub-scanning dimension of a dot is WX0. A change in the developer sensitivity changes the amount of energy required to blacken the recording material (referred to simply as a "required energy amount" hereinafter). When the developer sensitivity has a value (assumed to be C0) corresponding to a required energy amount E0, exposure to (or irradiation with) a laser beam having an energy distribution indicated by E=F(X) in FIG. 5 produces a dot having the sub-scanning dimension WX0. When the developer sensitivity is relatively lowered to a value (assumed to be C1) corresponding to a required energy amount E1, exposure to a laser beam increased in the amount of emitted light and having an energy distribution indicated by E=F'(X) produces a dot having a sub-scanning dimension WX1' (approximately equal to WX0).

Such an adjustment of the amount of emitted light changes an energy distribution in the main scanning direction from E=G(Y) to E=G'(Y) in FIG. 6. This increases the amount of energy stored in the recording material to provide a main scanning dimension WY1' approximately equal to an original main scanning dimension WY0 even if the developer sensitivity is lowered from the value C0 to the value C1. However, there arises a deviation $\Delta$WY between WY0 (the required main scanning dimension) and WY1' (the main scanning dimension after only the adjustment of the amount of emitted light) because of the energy storage effect in the main scanning direction as described above which need not be considered for the sub-scanning direction.

The deviation $\Delta$WY of the main scanning dimension can be eliminated by adjusting a main scanning rate or adjusting the time duration of light emission from the laser light source per dot. Assuming the main scanning rate to be V, increasing or decreasing (in the above example, increasing) the time duration of light emission from the laser light source per dot by an amount (assumed to be a correction amount $\Delta$T) obtained by dividing the deviation $\Delta$WY by the main scanning rate V allows the recording of a dot having a proper main scanning dimension as well on the recording material. This eliminates the deviation ΔWY without any influence upon the sub-scanning dimension of the dot.

Figure 7:
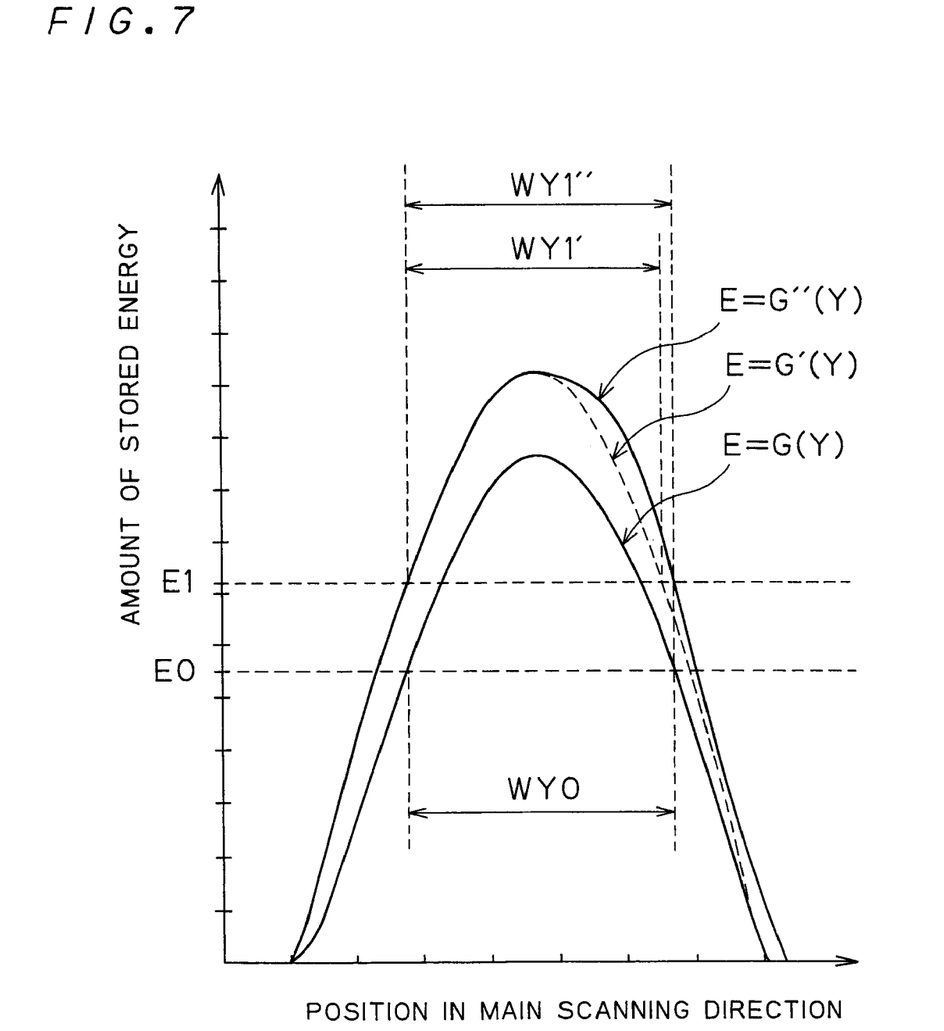

FIG. 7 shows a stored energy distribution in the main scanning direction when an output waveform of the laser light source drive signal is increased by the correction amount ΔT to eliminate the deviation ΔWY. The energy distribution at this time is indicated by E=G"(Y) as shown in FIG. 7, and the main scanning dimension of a dot is adjusted to WY1"(=WY0).

Thus, even if a change occurs in at least one of the factors which influence the dot size on the recording material, the combination of adjustment items having different degrees of influence upon the main scanning dimension and the sub-scanning dimension allows the recording of a dot of proper size at all times.

Although the change in the developer sensitivity is compensated for by the combination of the adjustment of the amount of emission of the laser beam and the adjustment of the time duration of light emission per dot in the above description, it is needless to say that a different combination of adjustment items may be used. For example, the change in developer sensitivity may be compensated for by changing the amount of emission of the laser beam and the main scanning rate. Although the compensation for the change in the developer sensitivity is described above as an example, other changes may be compensated for. For example, the present invention is applicable when a changes is made in the developer temperature and developing time in the developing apparatus or in the sensitivity of the recording material.

An image recording system to which the present invention is applied will now be described with reference to the drawings.

Figure 8:
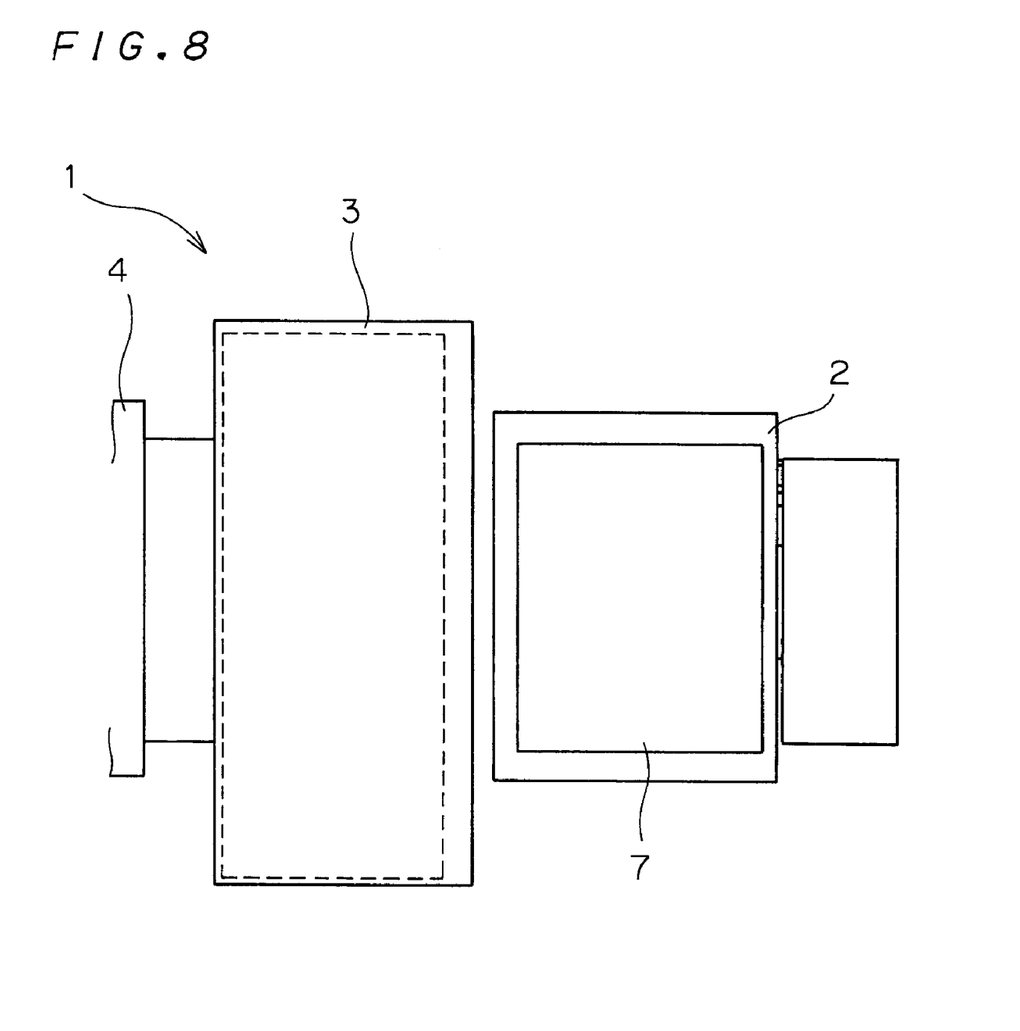
FIG. 8 is a top view of an image recording system applied to a preferred embodiment according to the present invention.
Figure 9:
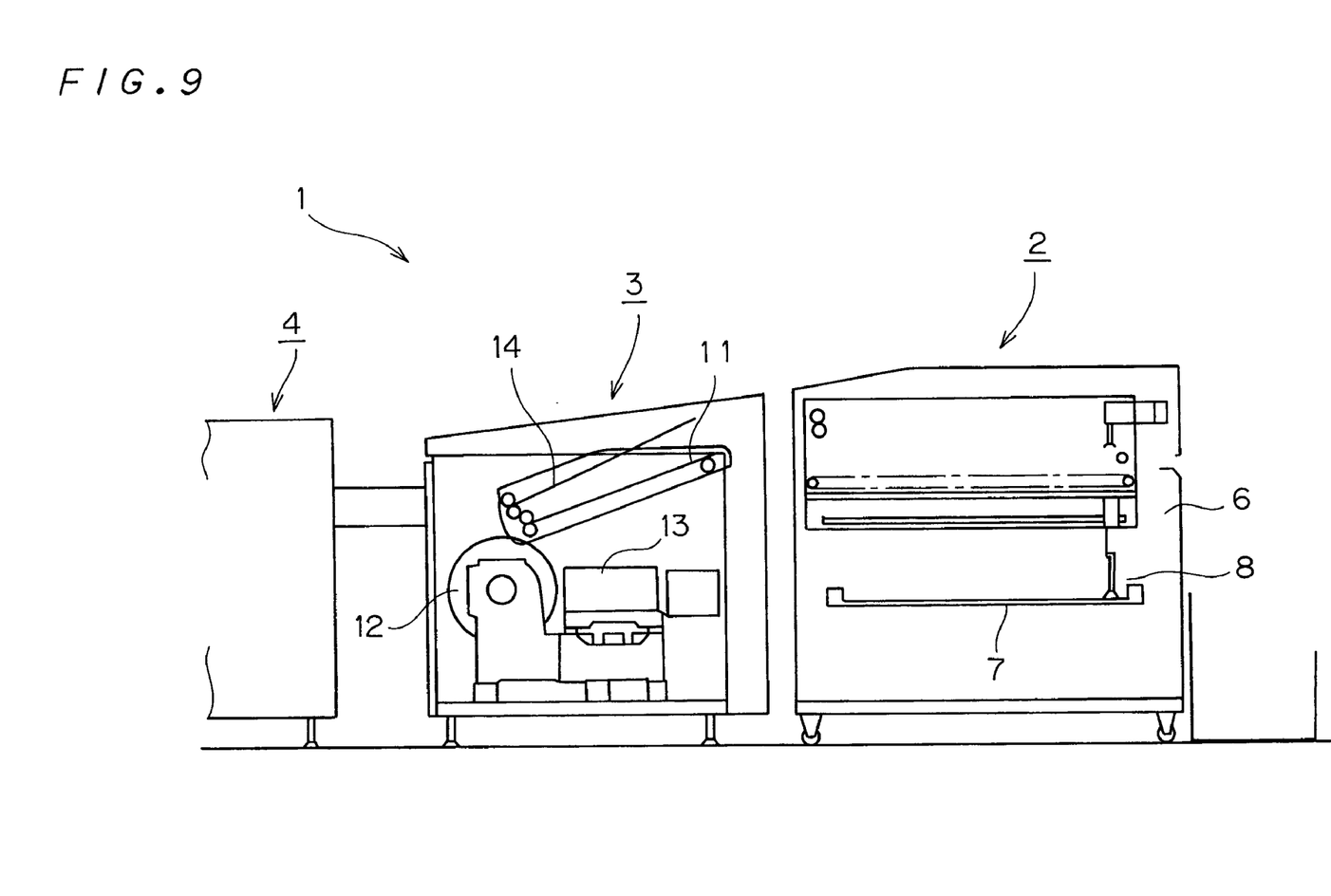
FIG. 9 is a side view of the image recording system applied to the preferred embodiment according to the present invention.

FIG. 8 is a top view of an image recording system 1 to which the present invention is applied, and FIG. 9 is a side view thereof. The image recording system 1 comprises a plate supply apparatus 2, an image recorder 3 and an automatic developing apparatus 4. Plates for use in the image recording system 1 include a heat-sensitive material (generally referred to as a "thermal plate") which responds to heat generated by laser beam irradiation to record information about an image thereon.

The plate supply apparatus 2 extracts a plate stored in a cassette 7 and transports the plate to a feed passage 11 of the image recorder 3. Typically, a plurality of plates are stored in the cassette 7.

The image recorder 3 is provided to record information about a two-dimensional image comprised of a plurality of dots onto the plate supplied from the plate supply apparatus 2. As illustrated in FIG. 9, the image recorder 3 comprises a recording drum 12 rotating with the supplied plate wound around an outer periphery thereof, a recording head 13 for irradiating the plate wound around the outer periphery of the recording drum 12 with a laser beam modulated in accordance with an image signal, and a discharge passage 14 for moving the information-recorded plate in a switch-backing manner to transport the information-recorded plate to the automatic developing apparatus 4 in the next stage.

The automatic developing apparatus 4 develops with a developer the plate on which information about an image is recorded, and then dries the plate. The automatic developing apparatus 4 comprises a developer tank and a drying section both not shown. The automatic developing apparatus 4 performs feedback control so that the temperature of the developer in the developer tank and the developing time (the time required for the plate to pass through the developer tank and the drying section) are maintained constant.

In such an image recording system 1, the plate stored in the cassette 7 of the plate supply apparatus 2 is transported to the image recorder 3 while part of the plate is fixedly held under suction by a movable suction arm 8 of an autoloader mechanism 6 in the plate supply apparatus 2.

Then, this plate passes through the feed passage 11 in the image recorder 3 and is wound around the outer periphery of the recording drum 12. In this state, the recording drum 12 rotates at high speeds. A laser light source incorporated in the recording head 13 irradiates a surface of the rotating plate wound around the recording drum 12 with the laser beam modulated in accordance with the image signal. Thus, the recording head 13 records information about an image in the main scanning direction of the plate. The recording head 13 also moves along the axis of rotation of the recording drum 12 in synchronism with the rotation of the recording drum. Thus, the recording head 13 records information about the image in the sub-scanning direction of the plate. In this manner, the information about a desired two-dimensional image is recorded on the surface of the plate.

The plate on which the information about an image is recorded is transported through the discharge passage 14 of the image recorder 3 to the automatic developing apparatus 4. This plate is developed in the developer tank of the automatic developing apparatus 4, dried by the drying section, and is then discharged out of the automatic developing apparatus 4. The developer tank is equipped with a sensor 41 (see FIG. 10) for measuring the electric conductivity of the developer.

Figure 10:
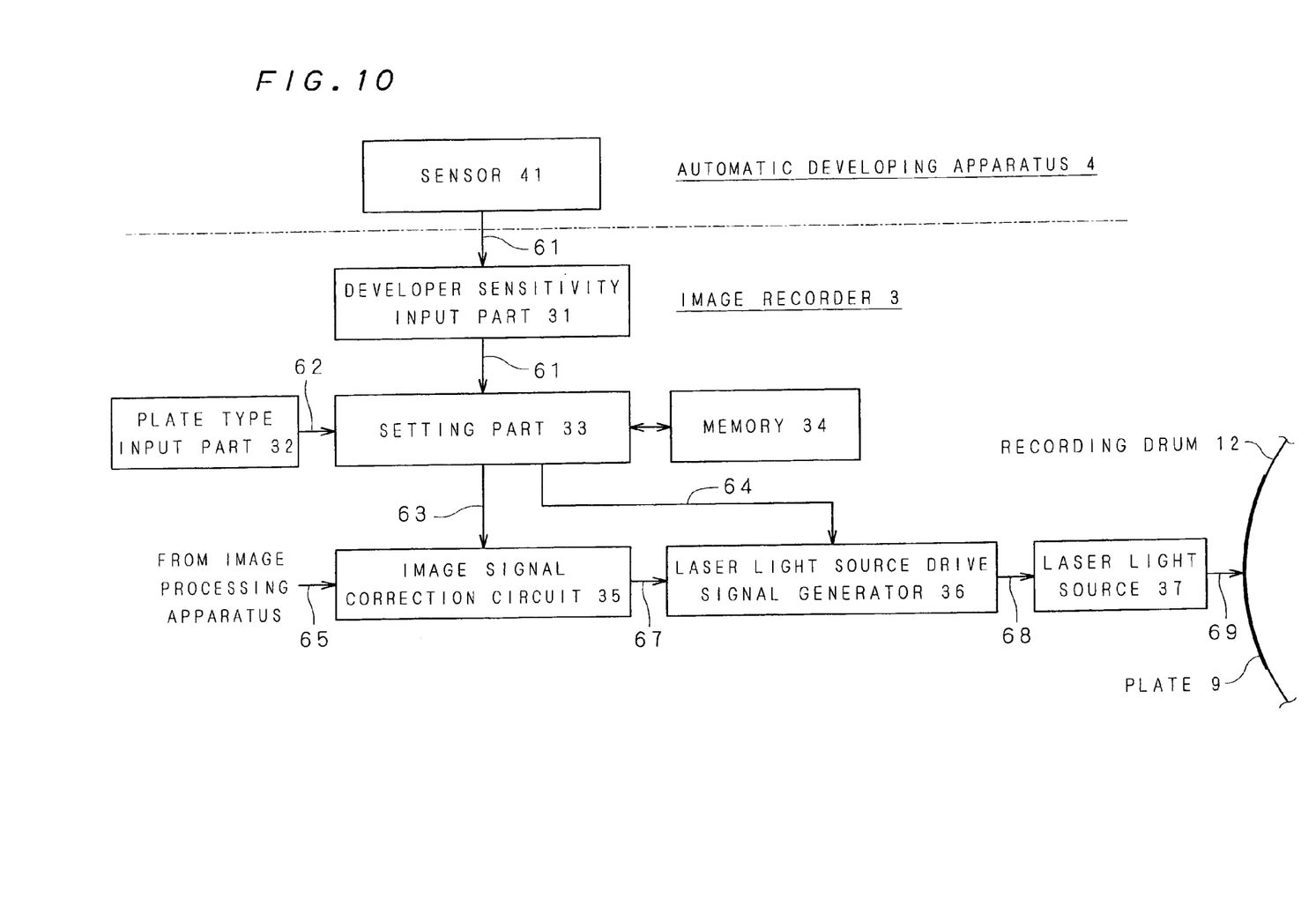
FIG. 10 is a block diagram of a processing section in an image recorder.

FIG. 10 is a block diagram showing a construction of a processing section of the image recording system 1 to which the present invention is applied. The processing section includes the sensor 41 as an element included in the automatic developing apparatus 4. The processing section further includes a developer sensitivity input part 31, a plate type input part 32, a setting part 33, a memory 34, an image signal correction circuit 35, a laser light source drive signal generator 36 and a laser light source 37 all of which are elements included in the image recorder 3.

The sensor 41 measures the electric conductivity 61 of the developer in the developer tank in the above-mentioned automatic developing apparatus 4. Since the electric conductivity, in general, is highly correlated with the developer sensitivity, the developer sensitivity is detected by measuring the electric conductivity of the developer. The developer sensitivity input part 31 inputs the electric conductivity 61 measured by the sensor 41 to the setting part 33. The plate type input part 32 inputs a plate type 62 of a plate 9 wounded around the recording drum 12, and includes a known keyboard or mouse.

Figure 11:
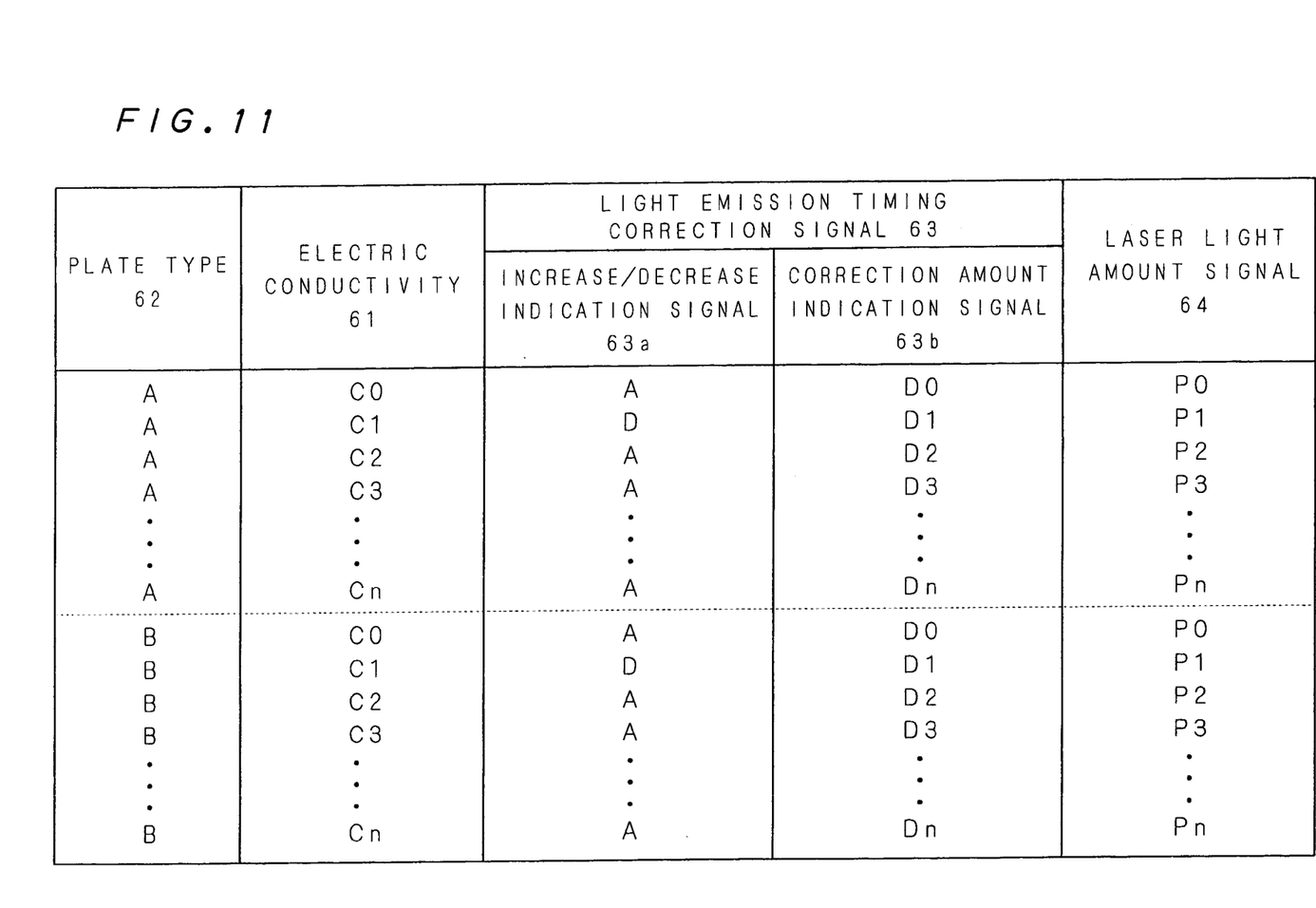
FIG. 11 shows the memory contents in a memory.

FIG. 11 shows the memory contents in the memory 34. The memory 34 stores therein the electric conductivity 61, a light emission timing correction signal 63 and a laser light amount signal 64 in corresponding relation to each plate type 62, the laser light amount signal 64 being provided for attaining the amount of light emitted from the laser light source 37 required to form dots of proper size.

The plate types 62 in the memory 34 are classified according to the degree of response to laser irradiation or the developer, such as the above-mentioned gamma characteristic.

An increase/decrease indication signal 63a and a correction amount indication signal 63b in the memory 34 constitute the above-mentioned light emission timing correction signal 63. The correction amount indication signal 63b is a signal for specifying the amount of delay of the image signal to be caused by delay circuits 52, 53 to be described later. The amount of delay corresponds to the above-mentioned correction amount ΔT.

The setting part 33 inputs the electric conductivity 61 and the plate type 62 to the memory 34. The setting part 33 also sends the light emission timing correction signal 63 outputted from the memory 34 to the image signal correction circuit 35, and sends the laser light amount signal 64 to the laser light source drive signal generator 36.

The image signal correction circuit 35 corrects an image signal 65 sent from an image processing apparatus not shown to output a corrected image signal 67. The laser light source drive signal generator 36 generates a laser light source drive signal 68, based on the corrected image signal 67 and the laser light amount signal 64. The laser light source 37 emits a laser beam 69, based on the laser light source drive signal 68.

Figure 12:
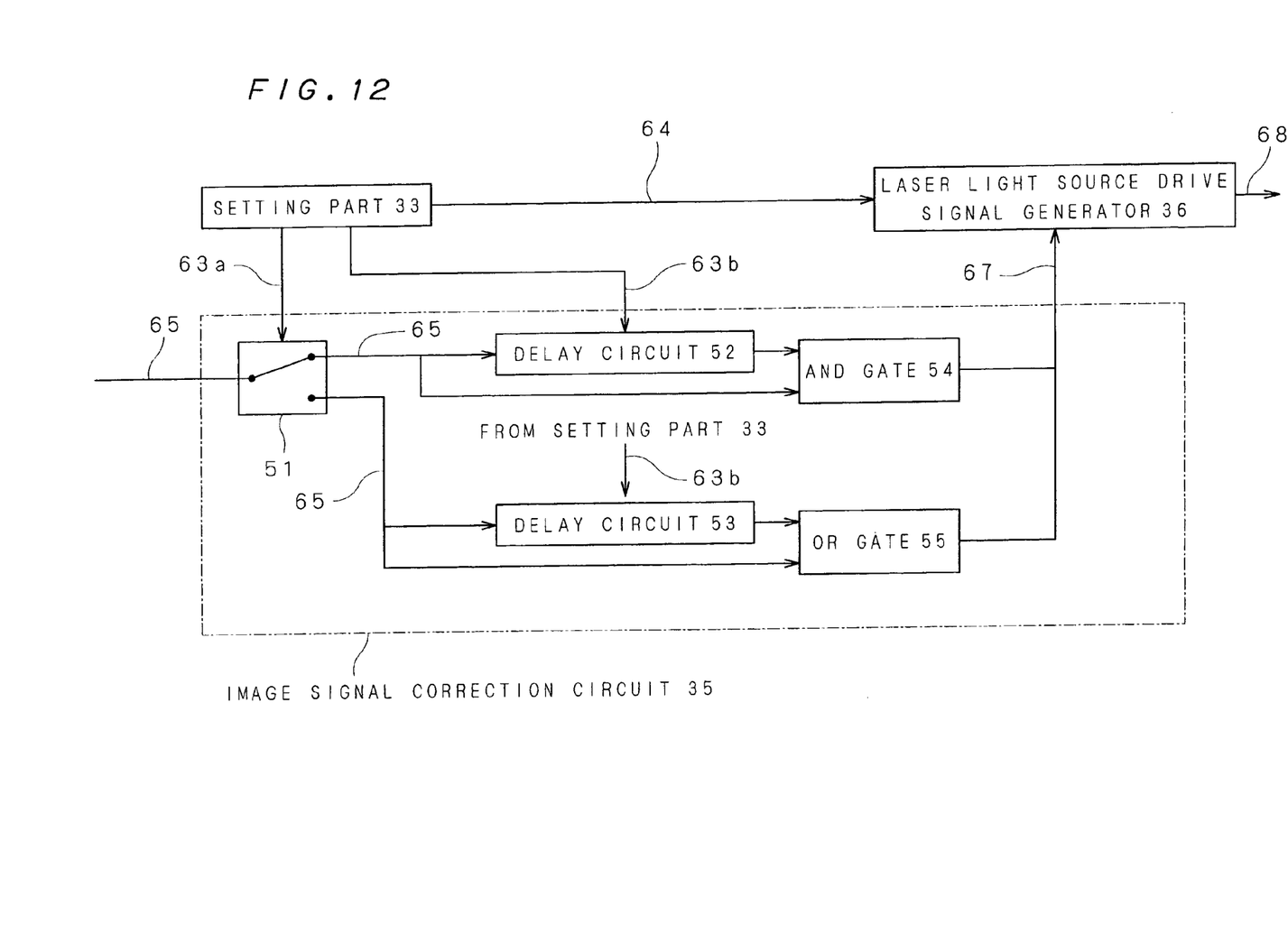
FIG. 12 is a block diagram showing a construction of an image signal correction circuit.

The image signal correction circuit 35 comprises a switch circuit 51, the delay circuits 52, 53, an AND gate 54 and an OR gate 55; as typically illustrated in FIG. 12. The light emission timing correction signal 63 includes the increase/decrease indication signal 63a and the correction amount indication signal 63b, as shown in FIG. 11. The increase/decrease indication signal 63a controls the switch circuit 51 to determine whether to send the image signal 65 inputted to the image signal correction circuit 35 to the delay circuit 52 and the AND gate 54 or to the delay circuit 53 and the OR gate 55. The correction amount indication signal 63b is sent to the delay circuits 52 and 53 to cause the image signal 65 inputted thereto via the switch circuit 51 to delay by a length of time corresponding to the above-mentioned correction amount ΔT.

If a need exists to decrease the main scanning dimension of dots, a decreasing correction is performed on the image signal 65. For the decreasing correction, the increase/decrease indication signal 63a indicates "decrease (D)," and the image signal 65 is sent to a branch including the AND gate 54. On the other hand, if a need exists to increase the main scanning dimension of dots, an increasing correction is performed on the image signal 65. For the increasing correction, the increase/decrease indication signal 63a indicates "increase (A)," and the image signal 65 is sent to a branch including the OR gate 55.

Figure 13:
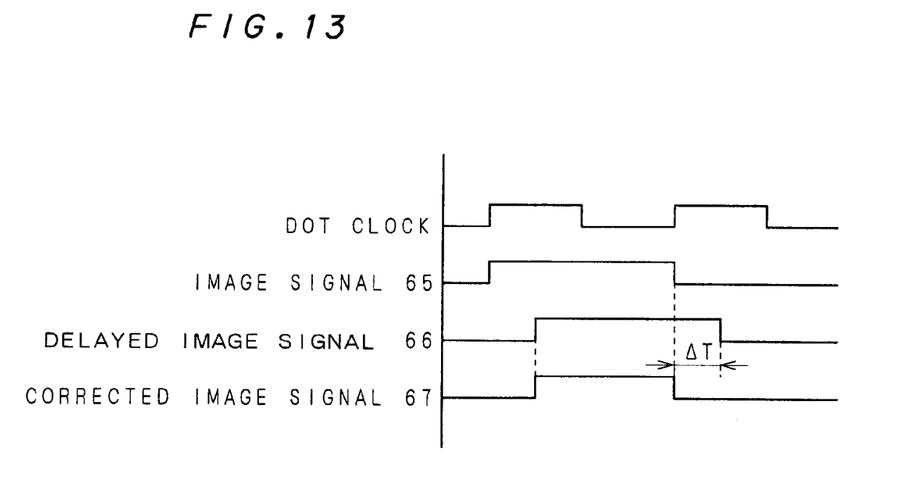
FIGS. 13 and 14 are diagrams showing an example of processing in the image signal correction circuit.

FIG. 13 is a diagram for illustrating the image signal correction when the image signal 65 is sent to the branch including the AND gate 54. The delay circuit 52 outputs a delayed image signal 66 which lags the delay time ΔT behind the image signal 65. The AND gate 54 performs an AND operation on the image signal 65 and the delayed image signal 66 to output the corrected image signal 67. It will be apparent from FIG. 13 that the corrected image signal 67 is shorter by the correction amount ΔT than the image signal 65.

Figure 14:
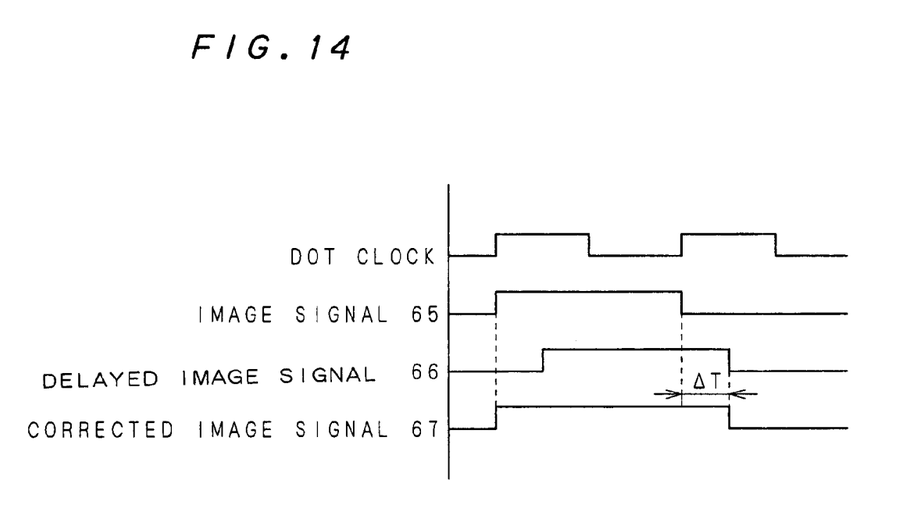

FIG. 14 is a diagram for illustrating the image signal correction when the image signal 65 is sent to the branch including the OR gate 55. The delay circuit 53 outputs the delayed image signal 66 which lags the delay time ΔT behind the image signal 65. The OR gate 55 performs an OR operation on the image signal 65 and the delayed image signal 66 to output the corrected image signal 67. It will be apparent from FIG. 14 that the corrected image signal 67 is longer by the correction amount ΔT than the image signal 65.

The corrected image signal 67 is outputted to the laser light source drive signal generator 36. The laser light source drive signal generator 36 generates the laser light source drive signal 68 for emitting a laser beam to be turned on/off by the corrected image signal 67 with power responsive to the laser light amount signal 64 sent from the setting part 33, thereby to drive the laser light source 37.

In the image recording system 1 as discussed above, if a change occurs in at least one of the sensitivity of the plate (recording material) and the developer sensitivity of the automatic developing apparatus 4, the setting part 33 sets conditions depending on the change for the image signal correction circuit 35 and the laser light source drive signal generator 36 which in turn adjust the image signal 65 and the laser beam amount, respectively. Therefore, the image recording system 1 is capable of always recording a high-quality image on the plate (recording material).

Although the sensor 41 equipped with the developer tank for measuring the electric conductivity automatically detects the sensitivity of the developer in the above preferred embodiment, the present invention is not limited to such a configuration. For example, the automatic developing apparatus 4 may develop a sample (known as a control strip) on which a standard image of stepwise varying densities is formed, thereby to measure the sensitivity of the developer. In this case, the sensor 41 is not used, but a user manually enters a value indicating the sensitivity of the developer through an input part including a known keyboard or mouse.

Although the image recorder 3 is of the external drum recording type in the above-mentioned preferred embodiment, it is needless to say that the present invention is also applicable to an internal drum recording type and to a plane scanning type. Thus, the present invention is widely applicable independently of recording methods.

While the invention has been described in detail, the foregoing description is in all aspects illustrative and not restrictive. It is understood that numerous other modifications and variations can be devised without departing from the scope of the invention.

What is claimed is:

1. An image recorder for recording information about a two-dimensional image made up of a plurality of dots on a recording material by relatively moving a laser spot in a main scanning direction and in a sub-scanning direction, said laser spot being formed on said recording material by irradiation with a laser beam, said image recorder comprising:

a laser light source for emitting said laser beam;

a laser light source drive part for driving said laser light source, based on an image signal;

an image signal correction part for correcting said image signal to be provided to said laser light source drive part;

an input part for inputting factor information influencing the size of said dots; and a setting part for adjusting and setting a light emission duration per dot and a light emission amount of said laser light source in accordance with said factor information inputted by said input part, wherein said setting part is capable of providing a light emission timing correction signal for correcting the light emission duration per dot of said laser light source to said image signal correction part, and of providing a light amount setting signal for setting the light emission amount of said laser light source to said laser light source drive part, and said light emission timing correction signal and said light amount setting signal are associated with each other.

2. The image recorder according to claim 1, further comprising:
a memory for storing therein said factor information, said light emission timing correction signal and said light amount setting signal in corresponding relation to each other,
wherein said setting part reads from said memory said light emission timing correction signal and said light amount setting signal corresponding to said factor information inputted by said input part.

3. The image recorder according to claim 2, wherein
said factor information includes at least one of a first factor related to a characteristic of said recording material and a second factor related to processing of a recorded material.

4. The image recorder according to claim 3, wherein
the processing of said recorded material includes a developing process of said recorded material.

5. The image recorder according to claim 4, wherein
said second factor includes information indicating the sensitivity of a developer for use in said developing process.

6. The image recorder according to claim 3, wherein
said recording material includes a heat-sensitive material responsive to heat generated by irradiation with said laser beam.

7. The image recorder according to claim 6, wherein
said first factor includes information indicating the sensitivity of said recording material.

8. A method of recording information about a two-dimensional image made up of a plurality of dots on a recording material by relatively moving a laser spot in a main scanning direction and in a sub-scanning direction, said laser spot being formed on said recording material by irradiation with a laser beam, said method comprising the steps of:
inputting factor information influencing the size of said dots;
adjusting and setting a light emission duration per dot by providing a light emission timing correction signal for correcting said light emission duration per dot of said laser beam in accordance with said factor information inputted;
adjusting and setting an emission light amount by providing a light amount setting signal for setting said light emission amount of said laser beam in accordance with said factor information inputted; and
emitting said laser beam, based on said emission duration per dot and said emission amount both adjusted and set, and wherein
said light emission timing correction signal and said light amount setting signal are associated with each other.

9. The method according to claim 8, further comprising the step of:
reading, from a memory for storing therein said factor information, said light emission timing correction signal and said light amount setting signal in corresponding relation to each other, said light emission timing correction signal and said light amount setting signal corresponding to said factor information inputted.

10. The method according to claim 9, wherein
said factor information includes at least one of a first factor related to a characteristic of said recording material and a second factor related to processing of a recorded material.

11. The method according to claim 10, wherein
the processing of said recorded material includes a developing process of said recorded material.

12. The method according to claim 11, wherein
said second factor includes information indicating the sensitivity of a developer for use in said developing process.

13. The method according to claim 10, wherein
said recording material includes a heat-sensitive material responsive to heat generated by irradiation with said laser beam.

14. The method according to claim 13, wherein
said first factor includes information indicating the sensitivity of said recording material.

* * * * *